United States Patent [19]

Kimura et al.

[11] 4,115,364

[45] Sep. 19, 1978

[54] PROCESS FOR PRODUCING MODIFIED PHENOLIC NOVOLAK FIBERS

[75] Inventors: Isao Kimura, Suita; Sizukuni Yata, Settsu, both of Japan

[73] Assignee: Nippon Kynol Incorporated, Osaka, Japan

[21] Appl. No.: 722,589

[22] Filed: Sep. 13, 1976

Related U.S. Application Data

[63] Continuation of Ser. No. 370,776, Jun. 18, 1973, abandoned.

[30] Foreign Application Priority Data

Jun. 19, 1972 [JP] Japan .................................. 47-61623
Sep. 7, 1972 [JP] Japan .................................. 47-89777
Dec. 19, 1972 [JP] Japan .................................. 47-128032
Feb. 24, 1973 [JP] Japan .................................. 48-22478

[51] Int. Cl.$^2$ ............................................ C08G 14/08
[52] U.S. Cl. ................................. 260/841; 528/131; 528/132; 260/840; 264/176 F; 264/210 F
[58] Field of Search ................... 260/59 R, 57 R, 51.5, 260/840, 841; 264/176 F, 210 F

[56] References Cited

U.S. PATENT DOCUMENTS

| 2,378,667 | 6/1945 | Vaala | 260/841 |
|---|---|---|---|
| 2,484,523 | 10/1949 | McClellan | 264/212 |
| 3,223,668 | 12/1965 | Stalego | 260/29.3 |
| 3,546,172 | 12/1970 | Johnson et al. | 260/51.5 |
| 3,808,289 | 4/1974 | Okuhashi et al. | 260/841 |
| 3,848,044 | 11/1974 | Hagiwara et al. | 260/841 |
| 3,884,754 | 5/1975 | Kimura et al. | 264/176 F |

FOREIGN PATENT DOCUMENTS

405,927  3/1965  Japan .................................. 260/176 F

*Primary Examiner*—Harold D. Anderson
*Attorney, Agent, or Firm*—Sherman & Shalloway

[57] ABSTRACT

A process for producing phenolic novolak filaments having improved heat resistance which comprises melt-spinning a fiber-forming phenolic resin and curing the resulting filaments, wherein at least one compound containing at least one group selected from the group consisting of active hydrogen-containing amino, amide, thioamide, ureylene and thioureylene groups and derivatives of these groups is applied to said phenolic resin before, during or after the curing treatment.

24 Claims, No Drawings

PROCESS FOR PRODUCING MODIFIED PHENOLIC NOVOLAK FIBERS

This is a continuation, of application Ser. No. 370,776, filed June 18, 1973, now abandoned.

This invention relates to modified phenolic fibers, and more specifically, to non-flammable and antifusing phenolic resin fibers and a process for producing these fibers.

It has been known to produce cured non-flammable and anti-fusing fibers by melt-spinning a phenolic resin or a thermoplastic resin material consisting predominantly of the phenolic resin, and then crosslinking the resulting filaments. Cured phenolic fibers obtained by melt-spinning a novolak resin prepared, for example, from phenol and formaldehyde, and crosslinking the resulting filaments with a mixed solution of hydrochloric acid and formalin are anti-fusing and solventinsoluble and have marked non-flammability. In other words, when exposed to flame, the fibers do not melt, but, are carbonized while retaining the original shape. Because of these superior properties, these fibers are suitable as fibrous materials in applications where a risk of fire exists or as flame-resistant garments.

However, phenolic fibers now commercially available still have a few defects, and their uses are limited. For example, because they are composed of crosslinked polymer, they are brittle and have low bending strength and unsatisfactory tenacity which is about 1.3 g/de. Another great defect is that in spite of their non-flammability and antifusing property, they have low heat resistance, and deteriorate considerably at high temperatures. For example, if the phenolic fibers produced in the above-mentioned manner are heated from room temperature in the gathered state, the exothermic decomposition reaction of the fibers begins at about 150° C., and even if the outer atmosphere is maintained at the same temperature, the decomposition reaction further proceeds owing to the heat generated, until at last the fibers are reduced to ash. In spite of the fact that the conventional phenolic fibers have superior non-flammability because of these superior properties, the use of these fibers in a high temperature atmosphere is very much limited.

It has now been found that the above defects are ascribable to the molecular structure of the phenolic resin that constitutes the phenolic fibers, and therefore, the defects can be remedied by modifying the molecular structure of the phenolic resin.

Accordingly, a primary object of this invention is to provide a process for producing phenolic fibers having superior heat resistance, good bending property and a smoother surface.

Another object of this invention is to provide novel phenolic fibers having superior heat resistance, good bending property and a smoothened surface.

The above and other objects of this invention along with its advantages will become more apparent from the following description.

According to this invention, there is provided a process for producing non-flammable and anti-fusing phenolic fibers having improved heat resistance, which comprises melt-spinning a fiber-forming phenolic resin and then curing the resulting fibers, wherein at least one compound containing at least one group selected from the group consisting of active hydrogen-containing amino, amide, thioamide, ureylene and thioureylene groups and derivatives of these groups is applied to said phenolic resin before, during or after the curing treatment.

The most critical feature of the process of this invention is that before, during or after the curing treatment a nitrogen-containing compound having at least one member selected from the group consisting of active hydrogen-containing amino, amide, thioamide, ureylene and thioureylene groups and derivatives of these groups (to be referred to as the active nitrogen-containing compound) is applied to the phenolic fibers to introduce a bond chain derived from this compound into the molecular structure of the phenolic resin, whereby the heat resistance and bending property of the phenolic fibers are considerably improved.

The present invention will be illustrated below in greater detail.

PHENOLIC RESINS

The phenolic resins that can be fabricated into the fiber form in the process of this invention are uncured and fusible in the starting molten mixture, and can be cured with a curing agent after melt-spinning or jet spinning (the spinning process whereby a fine stream of the molten mixture is let fall onto a path of a high speed gas stream such as a non-oxidizing gas, for example nitrogen gas, thereby to fiberize the stream of the molten mixture).

The method of preparing the phenolic resin is well known. It can be produced by reacting a phenol with an aldehyde under heat in the presence of an acid or basic catalyst. Usually, phenolic resins having a number average molecular weight of about 300 to about 2,000 are used. If desired, those having a larger molecular weight (for example, up to about 5,000) can also be used. As is well known, therefore, mainly novolac-type modified movolac resins obtained by any desired combination of the novolac-type reaction and the resol-type reaction can also be used. Furthermore, any desired combinations of phenols and aldehydes can be used, and different novolac resins each derived from a different combination of phenol and aldehyde can be used together.

The phenols used for producing the phenolic resins are most commonly phenol and cresol. But other phenols can also be used. Examples of the phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenyl, p-tertiary butyl phenol, p-tertiary amylphenol, bisphenol A, resorcinol, and mixtures of two or more of these with each other.

Furthermore, phenols containing at least one halogen atom, preferably up to 3 halogen atoms, on the benzene nucleus can be used. Examples of such halogenated phenols are o-chlorophenol, m-chlorophenol, p-chlorophenol, o-bromophenol, m-bromophenol, p-bromophenol, 3,5-dichlorophenol, 3,5-dibromophenol, 3-chloro-5-bromophenol, 2,3-dichlorophenol, 3,4-dichlorophenol, 2,3-dibromophenol, 3,4,5-trichlorophenol, 3,4,6-tribromophenol, and 2,3,6-tribromophenol. The o-chlorophenol, m-chlorophenol, and p-chlorphenol are especially preferred. Preferably, these halogenated phenols are used in combination with other phenols described above rather than alone. The halogenated phenols can be present in the mixture in an amount of at least 3% by weight, preferably 10 to 80% by weight, and more preferably 20 to 60% by weight, based on the total weight of the phenols. When the phenols containing these halogenated phenols are used, phenolic fibers having more improved heat resistance can be used.

The aldehyde most commonly used for polycondensation with the above phenol is formaldehyde, but other aldehydes such as para-formaldehyde, hexamethylene tetramine and furfural can also be used.

Various catalysts, acid or basic, can be used for phenolic resin-forming reactions. Examples of the acid catalyst include any known organic or inorganic acids, such as hydrochloric acid, nitric acid, sulfuric acid, phosphoric acid, zinc chloride, aluminum chloride, formic acid, acetic acid, oxalic acid, p-toluenesulfonic acid, or phthalic acid. The basic catalyst may, for example, be ammonia, sodium hydroxide, potassium hydroxide or hexamethylene tetramine.

The uncured phenolic resins obtained by addition or condensation of the phenols and aldehydes can be used as such for fiber preparation. It is also possible in the present invention to use blends of such phenolic resins as a main component and other fiber-forming thermoplastic synthetic resins. In the blend, the amount of the other fiber-forming thermoplastic synthetic resin may be less than 60% by weight but not less than 0.1% by weight based on the total weight of the blend. The amount of the fiber-forming thermoplastic synthetic resin is preferably 1 to 40% by weight, especially 5 to 30% by weight, and most preferably 10 to 25% by weight, based on the total weight of the blend.

The fiber-forming thermoplastic synthetic resin which constitutes the other element of the filament of this invention is preferably selected from the group consisting of polyamide resins, polyester resins, polyolefin resins and polyurethane resins. Other fiber-forming thermoplastic synthetic resins can also be utilized in this invention.

The term "fiber-forming thermoplastic synthetic resin", used in the present specification and appended claims, is meant to include not only the individual resins mentioned above, but also blends of different resins, copolymerized resins, of these with minor amounts of other copolymerizable comonomers, or blends of the same resins of different monomer combinations or molecular weights.

Of these fiber-forming thermoplastic synthetic resins, the polyamide resins are especially preferred in view of their good dispersibility in the novolac resin, good improving effects on the spinnability of the novolac resin, or little likelihood of exerting adverse effects on the flame-resistant and antifusing properties of the novolac resin, etc.

Specific examples of the fiber-forming thermoplastic synthetic resin include polyamide resins such as nylon 6, nylon 11, nylon 12, nylon 66, nylon 610, nylon 611, nylon 612, and blends of two or more of these with each other; polyester resins such as polyethylene terephthalate, polyesters derived from the same constituent elements as polyethylene terephthalate with part of ethylene glycol replaced by other known glycols, polyesters derived from the same constituent elements as polyethylene terephthalate with the terephthalic acid replaced by ortho- or meta-phthalic acids, other known aliphatic dicarboxylic acids or blends of two or more of these with each other; polyester ethers such as polyethylene hydroxybenzoate; elastomerid polymers such as polyurethane, and polyolefin resins such as polyethylene, polypropylene, an ethylene-propylene copolymer, or blends of two or more of these with each other.

Accordingly, it should be understood that the term "phenolic resin", used in the present specification and appended claims, is meant to include not only the phenolic resins alone but also the blends of the phenolic resins and the other fiber-forming thermoplastic synthetic resins described above.

The phenolic resin can be fiberized by melt-spinning or jet spinning.

The spinning apparatus and operation are well known, and will not be described in this specification. The molten mixture to be subjected to melt-spinning in this invention may contain hexamethylene-tetramine in the amount capable of inducing a partial curing of the mixture but being not detrimental to the melt-spinning of the molten mixture containing an uncured novolac resin, for example, in an amount of less than 5% by weight based on the uncured novolac resin. The incorporation of hexamethylenetetramine, however, is not altogether necessary, and it is sufficient that the melt-spun filament is cured using the curing agent described above.

The known treatments, such as filtration or defoaming, of the molten mixture can be performed at any time before the molten mixture reaches the spinneret. The spun filament can be cured after wind-up or at any time before wind-up. The wind-up rate is usually about 200 to 2500 meters per minute. Usually, wind-up rates somewhat faster than the spinning speed give favorable effects to the tenacity of the resulting filament.

Known oils, or n-paraffinic hydrocarbons, etc. can be utilized as spinning oil preparations.

The curing of the melt-spun filament can be performed in various ways.

CURING AND TREATMENT WITH THE ACTIVE NITROGEN-CONTAINING COMPOUNDS

According to the process of this invention, the active nitrogen-containing compound is introduced into the molecular structure of the phenolic resin, and reacted. The introduction can be performed in accordance with various embodiments which all come within the scope of the present invention.

Typical examples of the active nitrogen-containing compounds that can be used in this invention are:

(1) Compounds expressed by the formula

wherein Y is an oxygen atom, sulfur atom or NH group, and $R_1$, $R_2$, $R_3$ and $R_4$, which are the same or different, each represent a hydrogen atom, lower hydroxyalkyl group such as hydroxymethyl, hydroxyethyl or hydroxypropyl, or lower alkoxyalkyl group, preferably methoxymethyl, methoxyethyl and ethoxymethyl, or $R_1$ and $R_3$ together may form a lower alkylene group such as —$CH_2CH_2$— or —$CH_2CH_2CH$—.

Suitable examples of the compounds expressed by the formula (I) are as follows:

UREA COMPOUNDS

Urea, monomethylol urea, dimethylol urea, or precondensates of these, ethyleneures, dimethylolurea monomethyl ether, dimethylolurea dimethyl ether, dimethylolurea diethyl ether, dimethyluron, monomethylol ethyleneurea, dimethylol ethyleneurea, dimethylol ethyleneurea monomethyl ether, and dimethylol ethyleneurea dimethyl ether.

THIOUREA COMPOUNDS

Thiourea, monomethylol thiourea, dimethylol thiourea, or precondensates of these, dimethylol thiourea monomethyl ether, dimethylol thiourea dimethyl ether, monomethyl thiourea monoethyl ether, monomethylol ethylene thiourea, dimethylol ethylene thiourea, dimethylol ethylene thiourea monomethyl ether, and dimethylol ethylene thiourea dimethyl ether.

GUANIDINE COMPOUNDS

Guanidine, 1-monomethylol guadinine, 1,3-dimethylol guanidine, or precondensates of these, 1,3-dimethylol guanidine monomethyl ether, and 1,3-dimethylol guanidine dimethyl ether.

(2) Melamine compounds such as melamine, guanamine, or methylol derivatives of melamine, (3) Amide-containing vinyl compounds such as acrylamide, acrylthioamide, N-methylated acrylamide, N-methylolated acrylthioamide, and N-methylol acrylamide methyl ether.

(4) Other amine-group containing compounds such as dicyandiamide, triethylene tetramine, polyethylene imine, piperazine, and methylol derivatives of these.

Of the above-described active nitrogen-containing compounds, the compounds of the formula (I), especially urea, thiourea, mono- or di-methylol derivatives thereof, and methyl- or ethyl- ethers thereof are preferred in the present invention. These compounds can be used either alone or in combination of two or more.

Now, the introduction of the active nitrogen-containing compounds will be described.

(A) In one embodiment, the active nitrogen-containing compound can be introduced into the phenolic resin prior to spinning. According to this first embodiment, there is provided a method wherein a mixture of the phenolic resin with 0.2 to 30% by weight, preferably 1 to 30% by weight, more preferably 3 to 10% by weight, of at least one of the active nitrogen-containing compounds is melt-spun, and the resulting phenolic filaments are cured by a method known per se.

The introduction of the active nitrogen-containing compound can be performed by mixing at least one of the above compounds with the powders of the phenolic resin, and then melting the phenolic resin, followed by spinning; or incorporating at least one of the above compounds in the molten phenolic resin, and then spinning the melten mixture. Further, the two can be uniformly blended by adding the above compound or its solution to a solvent solution of the phenolic resin. After this, the solvent is evaporated off, and the residue can be melt-spun. The melt-spun uncured phenolic filaments can be then cured at room temperature to an elevated temperature of up to about 150° C. by a method known per se.

The curing method can be chosen according to the type and amount of the phenolic resin, the type and amount of the thermoplastic synthetic resin, the denier of the filament, the type and amount of the curing agent, and the like.

Formaldehyde is most commonly used as a curing agent. Other curing agents can also be used, the examples being aldehydes such as paraformaldehyde, hexamethylene tetramine, furfural, chloral, or glyoxal, and compounds which generate formaldehyde for example, by heating, such as trioxane, tetraoxane or polyoxymethylene.

Generally, the melt-spun filaments are immersed, or caused to run through, a bath containing the curing agent and the basic or acid catalyst described above and held at room temperature or temperatures near room temperature, for example, 5° to 45° C., preferably 10° to 40° C., and heat-cured at a temperature, for example, 60° to 140° C., preferably 70° to 1130° C. The contacting between the filaments and a liquid containing the curing agent is not limited to the method described, but other means such as spraying or fuming can also be utilized.

One example of the liquid containing the curing agent is a 5-5%, preferably 15-30%, aqueous solution of formaldehyde of which pH has been adjusted to 8-13, preferably 8.5-11 by addition of the basic catalyst.

Another example of the liquid containing the curing agent is a 0.5-40%, preferably 1-35%, aqueous solution of formaldelyde and 0.1-35%, preferably 1-20%, of the acid catalyst as mentioned above.

In another embodiment of curing, the filaments are cured by heating in a mixed bath of hexamethylene tetramine and an n-paraffinic hydrocarbon at 50° to 150° C. According to still another embodiment, the filaments are treated in a fume or vapor containing formaldehyde and the basic or acid catalyst.

Preferably, after contacting the melt-spun filaments with the curing agent, the temperature is raised gradually to the heat-curing temperature. For example, the temperature is raised to the desired point at a rate of about 3° to 20 C/hour from the initiation of heat-curing. Or the temperature is maintained as low as possible at the initial state of heat-curing, and substantial raising of the temperature is performed from the intermediate stage of heat-curing until the final desired temperature is obtained, or substantial temperature raising is performed from the initial stage of heat-curing, but the final temperature is held at as low point as possible and this state is maintained. After the curing operation, the filaments are washed with water, and dried to obtain a final filament product.

The heat-curing time is optionally chosen according to the way in which the curing operation is performed, the heating temperature, the type and concentration of the curing agent and catalyst, the type and amount of the novolac resin, the type and amount of the thermoplastic synthetic resin, the denier of the filaments, etc. Usually, it is about 1 to 20 hours. If desired, the heat-curing time can be either shorter of longer.

Specifically, for example, the uncured phenolic filaments are dipped at room temperature for 0 to 5 hours in a mixed aqueous solution containing 0.1 to 30% by weight of an acid catalyst, for example, a mineral acid such as hydrochloric acid, sulfuric acid or Lewis acid, an organic carboxylic acid such as acetic acid or formic acid, or a sulfonic acid such as p-phenolsulfonic acid or p-toluenesulfonic acid and 0.5 to 35% by weight of an aldehyde such as formaldehyde with a filament-to-solution ratio of 1:5 to 1:200, and the solution is heated from room temperature to 50° to 105° C. in the course of 0.05 to 10 hours. The solution is then maintained at a temperature of 50° to 105° C. for 2 to 20 hours to cure the filaments. In an alternative embodiment, the solution after heating as mentioned above is maintained at a temperature of 50° to 105° C. for 0 to 2 hours to cure the filaments partially, preferably to a curing degree of 0.5

−3%, especially 1−2%, and then the filaments are immersed at room temperature in a mixed aqueous solution containing 0.2 to 15% by weight of a basic catalyst such as sodium hydroxide or potassium hydroxide and 1 to 35% by weight of formaldehyde. Then, the solution is heated to 70°−95° C. over a period of about 1 hour, and maintained at this temperature for 0.5 to 10 hours thereby to cure the filaments. In still another embodiment, the reaction at 50°−105° C. after heating in the above-mentioned curing reaction is carried out for 2 hours at the longest to cure the filaments partially to the curing degree mentioned above, and then the filaments are dipped at room temperature in a mixture, or a mixed aqueous solution, containing 0.2−15% by weight of the above basic catalyst or 0.1−30% by weight of the above acid catalyst, 1−35% by weight of formaldehyde and 0.1−80% by weight of a solvent. The solution is then heated to 40°−110° C. in the course of 0.2 to 2 hours, and maintained at this temperature for 0.2 to 10 hours to cure the filaments.

The solvent that can be used for this purpose may, for example, be alcohols such as methanol, ethanol or isopropanol, ketones such as acetone or methyl ethyl ketone, ethers such as dioxane or tetrahydrofuran, polar solvents such as dimethyl formamide, dimethyl acetamide or dimethyl sulfoxide, or aromatic hydrocarbons such as benzene, toluene or xylene.

The term "curing degree" of cured filaments, used in the present specification and appended claims, is the percentage of an increased weight of the cured filaments based on the original weight of the uncured filaments.

(B) According to second embodiment of this invention, there is provided a method of introducing the active nitrogen-containing compound which comprises treating the filaments with a liquid containing the active nitrogen-containing compound at any desired stage during the curing of the melt-spun uncured filaments.

This method can be performed by replacing at least a part of the curing treatment of phenolic filaments by a step of contacting the filaments with a liquid containing the active nitrogen-containing compound at room temperature to a temperature of 150° C. This liquid can contain an aldehyde and/or a basic or acid catalyst in the concentrations to be described. Most generally, the contacting can be performed by immersing the filaments in a liquid bath containing the nitrogen-containing compound, or by causing the filaments to run through the bath, or by spraying or fuming.

In this embodiment of this invention, the uncured filaments can be treated with a liquid containing the nitrogen-containing compound after curing them partially by a curing method per se. Or conversely, the filaments can first be treated with the above liquid, and then cured by a customary method. Or, the entire process of curing can be replaced by the treatment with the liquid containing the active nitrogen-containing compound. Furthermore, the curing treatment and the treatment with the above-described liquid can be carried out simultaneously. However, in either of the above methods of treatment, it is essential to treat the uncured filaments with a treating solution containing an aldehyde or a compound containing a group derived from an aldehyde, such as a methylol group, preferably those active nitrogen-containing compounds described above which contain hydroxyalkyl. This is for the purpose of ensuring a reaction between the phenolic resin and the active nitrogen-containing compound.

Furthermore, in order to avoid undesirable dissolution of the uncured filaments in an early stage of curing, it is desirable to treat the filaments with an aqueous treating liquid or an organic solvent-water treating liquor. In applying this method, it is recommended that the uncured phenolic filaments be first treated with an aqueous treating liquor or an organic solvent-water treating liquor to cure the filaments partially, and then, the partially cured filaments be further cured under stronger conditions while being swollen, thereby to form cured filaments which are cured even in their inner parts.

Several preferred embodiments of performing the process of this invention using this two-step treating method will be given.

(1) The uncured filaments are first dipped at 0° to 40° C. for 0 to 12 hours in an aqueous solution or organic solvent-water solution of a mixture of an aldehyde and the active nitrogen-containing compound or the active nitrogen-containing compound containing a lower hydroxyalkyl group, and the solution is heated in the presence of an acidic catalyst from room temperature to 50° − 105° C. in the course of 0.05 to 10 hours. The solution is maintained at this temperature for 0 to 2 hours to cure the filaments to a curing degree of 0.1 − 3 %, preferably 0.5 − 2.5%. The partially cured filaments are immersed in an organic solvent solution of the same or different kind of a lower hydroxyalkyl-containing active nitrogen-containing compound as or from the above nitrogen-containing compound or an aqueous or water-organic solvent solution of an aldehyde, and allowed to stand for 0 to 2 hours in the presence of a basic or acid catalyst. Then, the solution is heated gradually from room temperature to 50° − 150° C. in the course of 0 to 3 hours, and maintained at this temperature for 0 to 15 hours.

(2) The uncured filaments are dipped in an aqueous solution or organic solvent-water solution of an acid catalyst and an aldehyde, and allowed to stand for 0 to 12 hours at room temperature, and the solution is heated to 50° − 105° C. in the course of 0.1 to 3 hours. The solution is further maintained at this temperature for 0 to 2 hours thereby to cure the filaments partially to a curing degree of 0.1 to 3%, preferably 0.5 to 2.5%. The partially cured filaments are then dipped in an organic solvent solution or organic solvent-water solution containing the active nitrogen-containing compound and an acid or basic catalyst, and allowed to stand at room temperature for 0 to 2 hours. The solution is heated from room temperature to 40° − 120° C. in the course of 0 to 2 hours, and further maintained at this temperature for 0 to 20 hours.

In the second step of this method, the aldehyde described above may also be used, if desired, in combination with the active nitrogen-containing compound. Especially when the active nitrogen-containing compound does not contain a group derived from an aldehyde, such as a lower hydroxylalkyl group, the conjoint use of the aldehyde is recommended.

(3) Furthermore, the uncured filaments can be treated with a combination of the aldehyde and the active nitrogen-containing compound throughout the entire step of curing. For example, the uncured filaments are dipped at room temperature for 0 to 12 hours in an aqueous or organic solvent-water solution containing an acid catalyst, an aldehyde and the active nitrogen-containing compound, and the solution is gradually heated from room temperature to 50°−105° C. in the course of 0.05 to 10 hours. The solution is maintained at this temperature for 0 to 2 hours to form partially cured filaments (curing degree 0.1 - 3%, preferably 0.5 - 2.5%). The partially cured filaments are then dipped in an organic solvent or water-organic solvent solution containing an acid or basic catalyst, an aldehyde and the active nitrogen-containing compound, and allowed to stand at room temperature for 0 to 2 hours. Then, the solution is heated from room temperature to 50° - 150° C. for 0 to 3 hours, and maintained at this temperature for 0 to 15 hours thereby to introduce the nitrogen-containing compound into the phenolic filaments.

The method described in (3) is useful when the filaments are treated using an active nitrogen-containing compound free from an aldehyde-derived group (for example, hydroxyalkyl group) in the molecule.

Of the treating methods described above, method (3) is most preferred.

In any of these treatment methods, the concentration of the active nitrogen-containing compound in the treating liquor used can vary over a wide range according to such factors as the type or denier of the filaments to be treated, the type or amount of the curing agent, or the curing conditions (e.g., temperature or time). But generally, it is 0.2 to 35 % by weight, preferably 0.5 to 30 % by weight, more preferably 1 to 25% by weight, based on the weight of the treating liquor.

The aldehyde as a curing agent can be used in the same concentration as mentioned in (A) above, that is, in a concentration of 0.5 to 40% by weight, preferably 1 to 35% by weight.

Either basic or acid catalyst can be used in the above-described treatments. The basic catalyst can be used in a concentration of 0.2 to 15% by weight, preferably 0.5 to 10% by weight, based on the treating liquor, while the acid catalyst in a concentration of 0.1 to 35% by weight, preferably 1 to 20% by weight.

As is described above, not only the aqueous treating liquor but also the organic solvent-water solution or organic solvent solution can be used. The organic solvent that can be used may be any organic solvent which has a swelling action on the phenolic filaments, and is a solvent for the active nitrogen-containing compound and especially water miscible.

When an organic solvent having these properties is used, the phenolic fibers can be uniformly crosslinked by introducing the above-mentioned compound into the inside of the filaments while the phenolic filaments are swollen to any desired degree, and there can be obtained filaments having mechanical properties that can withstand various fiber processings and improved heat resistance that cannot be seen in the conventional phenolic fibers.

The organic solvent used for this purpose may, for example, be alcohols such as methanol, ethanol, or iso-propanol, ketones such as acetone or methyl ethyl ketone, ethers such as dioxane or tetrahydrofuran, polar solvents such as dimethyl formamide, dimethyl sulfoxide or dimethyl acetamide, and aromatic hydrocarbons such as benzene, toluene Methanol and acetone can be easily used in actual operations.

Of course, the amount of the organic solvent should be such as to be sufficient to dissolve the active nitrogen-containing compound used in this invention, and moreover should be such as to be sufficient for swelling the phenolic filaments fully in order to introduce the above compound into the uncured or half-cured phenolic filaments with good efficiency.

When a treating liquor of the water-organic solvent type is used, the ratio of water to the organic solvent is generally 1:0.05 to 1:200, preferably 1:0.1 to 1:50. When it is less than 1:0.05, it is insufficient for swelling the phenolic filaments. Furthermore, if the ratio is more than 1:200, the phenolic filaments are excessively swollen, and therefore, voids occur in the resulting cured filaments to render the yarn properties poor.

In any of the above-mentioned embodiments, the ratio of the filaments to be treated to the amount (cc) of the treating liquor is not critical, and can be varied widely depending upon whether the treating liquor is of the water, water-organic solvent or organic solvent type. There can be used the treating liquor in an amount of at least three times, usually at least 5 time, preferably at least 10 times, more preferably 15 to 20 times the amount of the filaments to be treated.

Where acrylamide or N-methylol acrylamide is used as the active nitrogen-containing compound, it is possible to perform polymerization within the inside of the treating filaments by incorporating a polymerization catalyst such as cerium nitrate together with an acid or basic catalyst in the treating liquor.

(C) According to still another embodiment of this invention, the cured insoluble and infusible phenolic filaments obtained by the curing treatment as described in detail in paragraph (A) can be treated with the active nitrogen-containing compound described above.

The treatment in accordance with the present invention can be performed on the filaments obtained by curing the uncured phenolic filaments partially to a curing degree of 3 - 25%, preferably 5 to 20%.

Generally, the cured filaments are contacted with an aqueous solution, organic solvent solution or water-organic solvent solution containing the active nitrogen-containing compound at room temperature or a temperature of 50° to 150° C. The concentration of the active nitrogen-containing compound in the above solution can be varied over a wide range according to such factors as the type, denier or curing degree of the filaments to be treated. Generally, it is 0.5 to 30% by weight preferably 1 to 25% by weight. The same organic solvents as mentioned in paragraph (B) can be used for this purpose. The solution may further contain 0.1 to 35% by weight, preferably 1 to 20% by weight, of the acid catalyst described above or 0.2 to 15% by weight, preferably 1 to 10% by weight, of the basic catalyst described above, and/or 1 to 35% by weight, preferably 5 to 30% by weight, of an aldehyde such as formaldehyde.

This post-treatment in this embodiment of the invention can be performed by various means according to such factors as the type, denier or curing degree of the filaments. Typical examples will be given below.

(a) The cured phenolic filaments are dipped in a solution containing the above-described active nitrogen-containing compound, and treated generally at 45° to 150° C., preferably 60° to 105° C. for 0.5 to 10 hours. Then, the treated filaments are washed and dried, thereby to introduce the active nitrogen-containing compound into the inside of the filaments. The form of bonding of the introduced active nitrogen-containing compound is not clear. It is assumed however that because a graft polymer resulting from the reaction with a free methylol group in the phenolic filament producing step is filled in the interspaces among the fibers, the motion of the fibrous structure of the phenolic filaments becomes better, and stress relaxation increases, and contributes to an increase in the tenacity of the filaments and to the improvement of the brittleness inherent to a three-dimensional cross-linked polymer.

(b) The cured phenolic filaments are immersed in a solution containing the active nitrogen-containing compound, and treated at 40° to 150°, preferably 60° to 120° C. for 0.05 to 2 hours, preferably 5 to 60 minutes. The filaments are then squeezed by a mangle, for example, and then treated for 0.5 to 2 hours in an atmosphere held at 70° to 180° C., preferably 90° to 160° C. thereby to introduce the nitrogen-containing compound not only onto the surface but also into the inner layer of the phenolic filaments. In this procedure, it is possible to pre-treat the filaments with the organic solvent described above in order to impregnate the nitrogen-containing compound into the interior of the filaments. For controlling the solubility, a small amount of water can be added as desired.

(c) A solution of the active nitrogen-containing compound is sprayed on the cured phenolic filaments or a knitted, woven or non-woven fabric, and the filaments are treated at 80° to 170° C. for 0.5 to 1 hour. thereby to introduce the nitrogen-containing compound into the phenolic filaments. In this case, the nitrogen-containing compound is introduced mainly onto the surface of the filaments to give improved thermal resistance.

The amount of the nitrogen-containing compound introduced in this procedure into the phenolic filaments is 0.5 to 25% by weight, preferably 2 to 20% by weight, more preferably 3.0 to 15% by weight, based on the weight of the filaments. If the amount is less than 0.5% by weight, sufficient heat resistance cannot be obtained, and if it exceeds 15% by weight, the heat resistance of the filaments is satisfactory, but the amount of the nitrogen-containing compound filled among the filaments is too large so that the movement of the filaments is impeded.

In any of the first to the third embodiments of this invention described in paragraph (A) to (C), it is desirable that the filaments are finally cured to a curing degree of 3 to 30%, preferably 5 to 20%.

The melt-spun filaments can be drawn at any desired time before and/or after curing. The drawing often results in desirable properties of the filaments.

The drawing operation may be conducted in one stage or in more stages, and the filaments can be either cold or hot drawn. In the case of a multi-stage drawing, cold drawing and hot drawing can be optionally combined. The draw ratio is also optional, and usually up to 2.5 based on the length of an undrawn filament.

FINAL PHENOLIC FIBROUS PRODUCTS

The modified phenol filaments treated in accordance with the method of this invention have markedly improved heat resistance, good yarn properties especially good bending property, and smooth surface while retaining the flame-resistant and antifusing properties most important for the cured phenolic fibers.

For example, the modified phenolic filaments of this invention have a heat resistance degree of not more than 0.5, and usually not more than 0.3. The heat resistance degree is measured as follows:

2 g of the phenolic fiber (about 3 denier) is made into a fiber ball having a packing density of 0.15 g/cm$^3$. On the other hand, the fiber ball is set inside a hot air circulating type dryer whose inside temperature is kept at 200° C. The temperature of the inside of the fiber ball is then measured continuously for 2 hours by a thermocouple. The heat resistance degree is defined by the following equation Heat resistance degree = $(T/200) - 1$ wherein T is the maximum temperature in degrees centigrade to which the inside of the fiber ball is heated.

Such a superior heat resistance of the modified phenolic filaments can be known also from the following comparative test.

When the curing reaction of phenolic filaments is conducted using an aldehyde such as formaldehyde as in the conventional technique, the decomposition of the phenolic filaments in air begins at about 150° C. However, the modified phenolic filaments obtained by the process of this invention do not decompose at a temperature of at least up to 200° C., usually up to 270° C.

When about 2 of the conventional phenolic filaments (1-4 denier) is made into a ball having a diameter of about 3 cm (the packing density, about 0.15g/cm$^3$), and allowed to stand in an air circulating dryer at 200° C., following which the temperature of the inside (center) of the fiber ball is measured continuously by a thermocouple thermometer, it is found that in about 10 minutes, the inside (center) of the ball reaches the temperature of the outer atmosphere (200° C), and in further 2 to 9 minutes, the temperature reaches 400° – 1000° C. whereupon the fiber ball itself burns and is reduced to ash. In fact, when the fiber ball is taken out from the dryer after about 40 minutes from the starting of the test, it is found to be completely reduced to ash, and its weight is nearly zero.

On the other hand, when the modified phenolic filaments obtained by the process of this invention are tested under the same conditions as above, the temperature of the inside (center) of the fiber ball reaches 200° C. in 10 to 40 minutes, but does not subsequently rise (even if it rises, it is within 10° C.). Even when the test is continued for more than 10 hours, the temperature of the filaments doe not exceed 200° C. Furthermore, with the modified phenolic fibers obtained under the preferred conditions (1 to 4 denier), no temperature rise is observed when they are allowed to stand in the above-mentioned air circulating dryer for more than 100 hour. The fibers so tested have almost the same tenacity as that of the original fibers. Their elongation is reduced considerably, but still feasible.

The weight decrease after testing does not exceed 5%, and the color of the filaments is only somewhat darker.

When the conventional phenolic filaments having more than 4 denier are tested for heat resistance under the same conditions, they are reduced to ash in 1 to 5 hours. However, when the phenolic filaments of this invention are held in a air circulating type drying kept at 200° C. for more than 5 hours, they are not reduced to ash nor carbonized. Furthermore, the weight loss of the filaments does not exceed 5%. The tenacity of the filaments is hardly changed from that of the original filaments, and the filaments are commercially feasible.

It is not clear why marked improvement in the heat resistance or bending property of the phenolic fibers can be performed in accordance with the process of this invention. We however presume that the active nitrogen-containing compound is introduced into the phenolic filaments and bonded to the free methylol group in the molecular structure of the phenolic resin by cross-linkage linkage or as end-blocker, or that it is filled in the network structure of the phenolic resin as a polymer, or that it is bonded to the phenolic resin as graft.

In the case of the cured filaments obtained by using urea or thiourea in accordance with the process of this invention, the urea or thiourea is considered to have been introduced into the phenolic resin in the following forms when the filaments are cured with formaldehyde, for example.

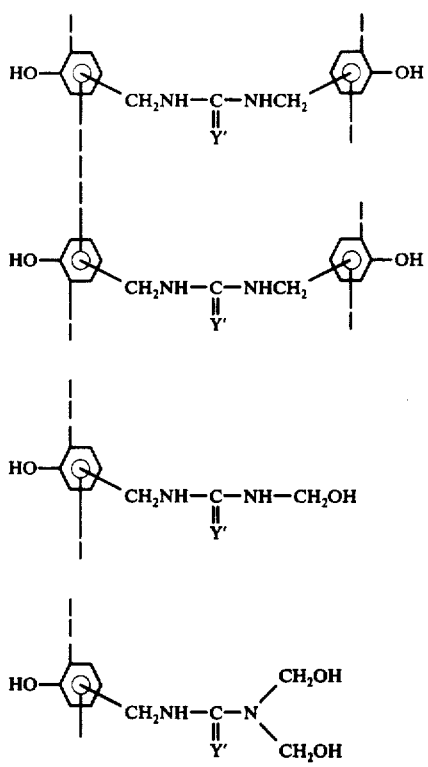

In these formulas (II), (III) and (IV), Y' represents an oxygen or sulfur atom.

Most of urea or thiourea is introduced in the form of formula (II) or (III) in the final phenolic filaments. Accordingly, there is provided a phenolic filament which contains in its fibrous structure a bond of the formula

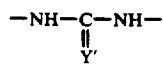

in an amount of 0.5 to 25% by weight, preferably 2 to 20% by weight, based on the weight of the filament.

The phenolic filaments having introduced thereinto urea or thiourea in the form of formula (II), (III) and/or (IV) above are novel filaments not described in the literature, and form part of the present invention.

UTILITY

The modified phenolic filaments of this invention have remarkably improved heat resistance and bending property as well as their inherent flame-resistant and anti-fusing properties. They can be directly used in the form of monofilaments, multifilaments, or tows, but can also be used in the form of fibers cut to the desired lengths. Or it can be used as spun yarns either alone or in admixture with known filaments or fibers, or in the form of twisted yarns. They can also be made into various filamentary structures such as knitted or woven fabrics or non-woven fabrics either alone or in admixture with known filaments.

The modified phenolic filaments or fibers of this invention find applications in apparel fields, interior decoration fields such as curtains or carpets, in the form of woven, knitted or non-woven fabrics, and paper, or as electrically insulating sheets.

The invention will be further illustrated by the following Examples.

EXAMPLE 1

A novolac resin was prepared in accordance with a customary method by condensing formaldehyde with a slightly excessive mol of phenol in the presence of a catalytic amount of oxalic acid. The resin was purified by removing the impurities and the residual phenol. The purified resin had a number average molecular weight of 960. The purified resin was coarsely pulverized and charged into a vessel adapted to be externally heated. The vessel was connected to a nozzle having 32 holes each with a diameter of 1.5 mm through a gear pump. The vessel was heated externally at 180° C., and the molten resin was extruded through the nozzle. The extrudate was taken up in the filament form on a rotating bobbin at a take-up speed of 1100 m/min. The filaments obtained had an average diameter of 9 microns.

50 g of the filaments are dipped at 50° C. in 1 liter of an aqueous solution containing 18% of formaldehyde and 18% of hydrochloric acid, and the solution was heated to 98° C. in the course of 1 hour. The filaments were immediately withdrawn from the treating solution, and without washing, immediately transferred to a solution at 20° C. of thiourea in a mixture of 200 cc of 35% hydrochloric acid, 200 cc of 36% formaldehyde and 600 cc of methanol. With the provision of a reflux condenser, the external temperature was raised to 85° C. in the course of 1 hour, and the solution inside was refluxed. Further in this state, the solution was maintained for 30 minutes, and the filaments were withdrawn from the solution. The filaments were then washed two times with 500 cc of methanol at room temperature, and then repeatedly with hot water, and dried.

The weight increase of the filaments was measured, and the curing degree of the filaments was determined. From the analysis of the nitrogen and sulfur contained in the cured filaments, the percentage of thiourea bonded to the filaments in the curing reaction was determined.

The heat resistance of the filaments was measured by the following method. 2 g of the filaments were made into a ball about 3.0 cm in diameter (packing density of about 0.15 g/cm³) and allowed to stand in an air circulating type dryer whose inside temperature was held at 200° C. The inside (center) of the fiber ball was measured continuously for 100 hours using a thermocouple thermometer. The maximum temperature reached or if the heat decomposition occurred, the time required until the temperature reached 300° C. was measured. The results are shown in Table 1 together with the properties of the filaments.

Table 1

| | Amount of thiourea (gr) | Curing degree (%) | Thiourea content (wt.%) | Heat resistance | | Yarn properties | | | |
| | | | | Maximum temp. reached (° C.) | Time required until 300° C. was reached (mm) | Untreated yarn | | Treated yarn | |
| | | | | | | Tenacity (g/d) | Elongation (%) | Tenacity (g/d) | Elongation (%) |
|---|---|---|---|---|---|---|---|---|---|
| Control | 0 | 4 | 0 | 750 | 25 | 0.9 | 7.0 | Not measurable because of ashing | |
| Present invention | 3 | 5 | 0.3 | 320 | 100 | 1.1 | 15.5 | 0.7 | 3.5 |
| " | 10 | 8 | 1.2 | 220 | Not reached | 1.2 | 14.8 | 1.1 | 10.2 |
| " | 50 | 12 | 2.2 | 200 | " | 1.4 | 16.2 | 1.4 | 11.1 |
| " | 100 | 16 | 5.2 | 200 | " | 1.3 | 17.5 | 1.5 | 9.8 |
| " | 300 | 19 | 9.5 | 200 | " | 1.4 | 18.9 | 1.5 | 10.5 |

As is clear from Table 1, the heat resistance of the filaments in which thiourea linkages were introduced were very much improved. It is also seen from Table 1 that good results were obtained with a thiourea linkage content of at least 0.5%, and this content is preferably at least 2%.

EXAMPLE 2

In the same way as in Example 1, uncured filaments obtained from the novolac prepared in Example 1 were dipped at 20° C. in 1 liter of an aqueous solution containing 18% of formaldehyde and 18% of hydrochloric acid, and the solution was heated to 98° C. in the course of 3 hours. Immediately then, the filaments were withdrawn from the solution, and immediately then, dipped at room temperature in a solution obtained by adding ethanol in various proportions to 200 cc of 35% hydrochloric acid, 200 cc of 36% formaldehyde and 80 g of urea, with the filaments-to-solution ratio being maintained at 1 : 100. In the course of one hour, the solution was heated to 85° C., and maintained at this temperature for one hour. Then, the filaments were withdrawn from the solution, washed with methanol, and dried. The curing degree, the urea linkage content, and heat resistance of the filaments obtained were determined, and the results obtained are shown in Table 2 along with the properties of the filaments.

of methanol, and then repeatedly with warm water until the filaments did not show acidity, followed by drying. The curing degree of the filaments was measured, and found to be 21%. Analysis of nitrogen contained in the cured filaments shown that 8.5% of the weight increase of the filaments as a result of the curing reaction was ascribed to the introduction of urea.

The resulting cured filaments had a tensile strength of 1.5 g/denier and an elongation of 55%, and showed no flame generation even when exposed to flame. The bending strength of the filaments was 2,400 times.

2 g of the filaments were made into a fiber ball having a packing density of about 0.15 g/cm³ by the same method as in Example 1. The fiber ball was allowed to stand in an air circulating dryer held at 200° C., and the temperature of the inside (center) of the filaments was continuously measured. When the external temperature reached 200° C. in 23 minutes, the test was continued for 100 hours. However, the temperature of the fiber ball did not go beyond 200° C. When the fiber ball was taken out from the dryer after this procedure, no apparently great change was observed either on the peripheral portion of the fiber ball or in the center of the ball. After the end of the test, the filaments had a tenacity of 1.6 g/denier and an elongation of 15%. The weight loss was 1%.

A similar test was conducted in an air circulating type

Table 2

| No. | Amount of ethanol added (cc) | Curing degree (%) | Urea Content (wt.%) | Heat resistance | | Yarn properties | | | |
| | | | | Maximum temp. reached (° C.) | Time required until 300° C. was reached (min.) | Untreated | | Treated | |
| | | | | | | Tenacity (g/d) | Elongation (%) | Tenacity (g/d) | Elongation (%) |
|---|---|---|---|---|---|---|---|---|---|
| 2-1 | 20 | 3 | 0.2 | 400 | 65 | 0.8 | 12.0 | 0.3 | 3.2 |
| 2-2 | 100 | 5 | 1.5 | 208 | Not reached | 0.9 | 14.2 | 0.7 | 10.1 |
| 2-3 | 300 | 12 | 4.2 | 200 | " | 1.2 | 15.2 | 1.1 | 11.1 |
| 2-4 | 600 | 19 | 7.1 | 200 | " | 1.5 | 17.8 | 1.5 | 12.2 |
| 2-5 | 1,000 | 17 | 3.8 | 203 | " | 1.3 | 16.5 | 1.2 | 7.3 |
| 2-6 | 4,000 | 12 | 0.3 | 350 | 95 | 1.1 | 13.4 | 0.5 | 4.0 |

EXAMPLE 3

50 g of the uncured filaments prepared in Example 1 were dipped at 20° C. in a solution of 100 g of dimethylol urea in 1 liter of 18% hydrochloric acid, and the solution was heated to 95° C. in the course of 1.5 hours. The uncured filaments obtained were withdrawn, and without washing, dipped at 20° C. in a solution of 100 g of dimethylol urea in a mixture of 200 g of 35% hydrochloric acid and 800 cc of methanol in a vessel equipped with a reflux condenser. In the course of 30 minutes, the external temperature was raised to 85° C., and the solution inside the vessel was boiled for an additional 30 minutes. The filaments were washed twice with 500 cc dryer held at 220° C. As in the above test, the temperature of the inside (center) of the fiber ball did not exceed 220° C. when the fiber ball was allowed to stand in the dryer for 100 hours. The fiber ball did not show any apparent change after the test. the filaments tested had a tenacity of 1.6 g/denier and an elongation of 14%. The weight loss was 2%.

EXAMPLE 4

A mixture consisting of 141 g of phenol, 54 g of p-cresol, 130 g of formaldehyde (37% aqueous solution), and 1 g of oxalic acid was heated at 100° C. for 3 hours with stirring. The product was neutralized with 0.9 g of sodium hydroxide. The novolac resin obtained was washed with water, and heated to 160° C. and 5 mmHg to remove low boiling compounds containing the unreacted matter. The resultant phenol-p-cresol copolymerized novolac resin had a number average molecular weight of 850. The resin was pulverized, and filled in a test tube equipped at its bottom with a projection having an opening with an inside diameter of about 1.5 mm. The test tube was heated externally so that the inside temperature reached 160° C. to melt the resin uniformly. By pressing the surface of the molten resin with a nitrogen gas at a pressure of 0.2 Kg/cm$^2$, the resin was extruded in filament form, and would up at a wind-up rate of 1000 m/min. on a drum with a diameter of 20 cm.

10 g of the filament obtained was dipped at 20° C. in 1 liter of an aqueous solution containing 18% of formaldehyde and 18% of hydrochloric acid, and the solution was heated to 98° C. in the course of 1 hour. The filament was washed with water to remove the treating solution, and then dipped at 20° C. in a solution of 120 g of trimethylol melamine in a mixture of 700 cc of acetone and 300 cc of 10% ammonium hydroxide. The solution was heated to an external temperature of 80° C. in the course of 30 minutes in a vessel equipped with a reflux condenser. The solution was maintained at this temperature for 1 hour with boiling under reflux. The resulting cured filament was withdrawn, washed several times with acetone and with warm water, and dried. The curing degree of the filament was found to be 8.5%. Analysis of the nitrogen content of the cured filament showed that 3.1% of the weight increase of the filament as a result of curing reaction was ascribable to the introduction of melamine.

The resultant cured filament has a tensile strength of 1.3 g/denier and an elongation of 38%. It was completely incombustible. When it was subjected to a heat resistance test in the same way as in Example 1 in an aircirculating dryer held at 200° C., the temperature of the filament reached 200° C. in 20 minutes, and then a temperature rise of about 5° C. was observed in the inside (center) of the fiber ball. Even when the fiber ball was allowed to stand in the dryer for an additional 20 hours, the temperature of the inside of the fiber ball did not go beyond 205° C. After the test, the weight loss was 4%, and the filament had a tenacity of 1.2 g/dinier and an elongation of 10%, which shows that the filament had feasible yarn properties.

EXAMPLE 5

800 g of the novolac resin prepared in Example 1 and 200 g of 12 nylon having an intrinsic viscosity of 1.1 were mixed in the powdery state, and the mixture was melted uniformly in a flask filled with nitrogen gas, while the external temperature of the flask was being maintained at 250° C. After cooling, the resin was withdrawn, and pulverized coarsely. Then, using the same apparatus as in Example 1, the resin was melt spun, and wound up. The resulting filaments (30 g) were dipped at 20° C. in 1 liter of an aqueous solution containing 200 g/liter of dimethylol ethyleneurea and 100 g/liter of ZnCl$_2$, and the solution was heated to 98° C. in the course of 2 hours. The treated filaments were withdrawn, and without washing, dipped at 20° C. in a mixture of 700 cc of dioxane and 300 cc of an aqueous solution containing 200 g/liter of dimethylol ethyleneurea and 100 g/liter of ZnCl$_2$. The solution was heated to 100° C. in the course of 1 hours, and maintained at this temperature for an additional 30 minutes. During this time, the dissipation of the dioxane out of the system was prevented by providing a reflux condenser in the reaction vessel. The treated filaments were withdrawn, washed with pure dioxane, and washed repeatedly with warm water and cold water, followed by cooling. The curing degree of the filaments was found to be 12%. Analysis of the nitrogen content of the treated filaments showed that 3.8% of the weight increase was ascribed to the introduction of the ethyleneurea.

The resulting cured filaments had a tensile strength of 1.2 g/denier and an elongation of 25%, and showed complete non-combustibility. In a heat resistance test by the same method as in Example 1, the temperature of the inside (center) of the fiber ball reached the external temperature (200° C.) in 22 minutes, and no temperature rise was observed thereafter. Even when the fiber ball was left to stand in this condition for an additional 20 hours, the temperature did not go beyond 200° C. The filaments withdrawn from the dryer after the test showed a weight decrease of 3%, and had a tenacity of 1.2 g/denier and an elongation of 11%.

When the uncured filaments obtained above were merely cured with HCl-HCHO systems, the resulting cured filaments showed self-burning property in a heat resistance test at 170° C. In this test, after a lapse of 30 minutes, the fiber ball was completely reduced to ash.

EXAMPLE 6

900 g of the novolac resin prepared in Example 1 and 100 g of polyethylene hydroxybenzoate having an intrinsic viscosity of 0.7 were mixed with each other in the powdery state, and the mixture was uniformly melted in a flask filled with nitrogen gas while maintaining the external temperature of the flask at 250° C. After cooling, the resin was withdrawn, and coarsely pulverized. The pulverized resin was melt spun using the same apparatus as used in Example 1, and wound up at a rate of 1100 m/min. in the form of filaments.

20 g of the resulting filaments were dipped at 20° C. in 1 liter of an aqueous solution containing 100 g/liter of N-methylol acrylamide, and a mixed aqueous solution of ceric nitrate and HNO$_3$ was added. With stirring, the solution was allowed to stand for 30 minutes. The filaments were then withdrawn, and transferred to a 20% aqueous solution of hydrochloric acid, and the solution was heated from 20 to 80° C. in the course of 1 hour. The filaments were withdrawn, and washed with water until the filaments did not show acidity, followed by drying. The treated filaments showed a weight increase of 7.2% (curing degree). The filaments obtained did not melt even when exposed to flame, nor did they burn. In the same heat resistance test as in Example 1, the temperature of the inside (center) of the fiber ball reached the external temperature (200° C.) in 18 minutes. When the filaments were then allowed to stand for 20 hours in the dryer, the inside temperature of the filaments did not go beyond 200° C. The filaments withdrawn from the dryer after the test showed a weight decrease of 4%. The tenacity of the filaments hardly changed from the original value before the heat resistance test, and the elongation decreases only slight. The filaments still proved feasible.

EXAMPLE 7

1410 g of phenol, 1180 g of formaldehyde (37% aqueous solution), 20 g of oxalic acid and 150 g of methanol were heated at 100° C. for 3 hours with stirring. The reaction was stopped by adding a large quantity of cold water. The resulting phenol resin was dissolved in methanol, and by heating at reduced pressure, the unreacted phenol, formaldehyde and methanol and some amount of water were evaporated off. There was obtained a thermoplastic novolac resin having a number average molecular weight of 960.

500 g of the resulting novolac resin was coarsely pulverized, and fully dried. The pulverized resin was placed in a 1-liter stainless steel melting vessel make adapted to be heated externally, and the inside of the vessel was repeatedly purged with nitrogen gas. Then, lowing method. 2 g of the fibers were made into a fiber ball having a diameter of about 3.0 cm (packing density of 0.15 g/cm$^3$). The fiber ball was then allowed to stand in an air circulating type dryer held at a temperature of 200° C., and the temperature of the inside (center) of the fiber ball was measured continuously for 10 hours by using a thermocouple thermometer.

The maximum temperature which the fibers reached, and where heat decomposition occurred, the time (minutes) required until the temperature of the inside of the fiber ball reached 300° C. were measured. The nitrogen content of the fibers was also determined. The results are shown in Table 3.

Table 3

|  | Nitrogen Content (wt.%) | Bending strength (times) | Heat resistance | | Yarn properties | | | |
|---|---|---|---|---|---|---|---|---|
|  |  |  | Maximum temperature reached (° C) | Time required until 300° C. was reached | Raw yarn | | Heated treated yarn | |
|  |  |  |  |  | Tenacity (g/d) | Elongation (%) | Tenacity (g/d) | Elongation (%) |
| Control | 0 | 25 | 750 | 25 | 1.2 | 25.3 | Not measurable because of ashing | |
| Present invention | 1.2 | 520 | 200 | Not reached | 1.5 | 19.5 | 1.7 | 10.2 | the resin was melted by maintaining the inside temperature of the vessel at 160° C. The molten novolac resin was extruded through a nozzle having 18 holse each with a diameter of 2.5 mm which was secured to the bottom of the melting vessel through a gear pump. The rate of extrusion was 3 g/min. The extruded filaments (50 d/18 f) were taken up on a bobbin at a rate of 1050 m/min. by means of a winder provided 1.5 meters below the nozzle. The filaments were then cut on the bobbin, and separated from it in the tow form.

100 parts of the resulting novolak fibers were dipped at 20° C. in 1500 parts of a mixed aqueous solution of 14% formaldehyde and 16% hydrochloric acid, and the solution was heated gradually to 95° C. in the course of 3 hours. Furthermore, the fibers were heat treated at 95° C. for 8 hours to form cured fibers which had a methanol-soluble portion in an amount of 1.2%.

The phenolic fibers produced above were immersed in a solution of 40 parts of dimethylol urea in a mixture of 440 parts of 98% ethanol and 20 parts of 35.5% concentrated hydrochloric acid with the fibers-to-solution ratio being maintained at 1 : 100. The reaction was carried out at 80° C. for 5 hours, and then the fibers were washed with water and dried to form modified phenolic fibers with a weight increase of 8.3%. The tenacity and elongation of the fibers were measured. Using a bending fatigue tester, the fibers were bended at an angle of 120° under a load of 1 g/d, and the number of bendings that were possible until the fibers broke was measured. Thirty samples were used for the measurement, and the average value for the three samples which showed intermediate values was calculated. The heat resistance of the fibers was measured by the fol- The results shown in Table 1 demonstrate that the filaments of the present invention have better tenacity, elongation and bending strength and far better heat resistance than the control sample. It was found that the tenacity of the fibers after heat-treatment rather increased.

EXAMPLE 8

The phenolic filaments obtained in Example 7 were dipped in a mixed solution consisting of 200 parts of methanol, 20 parts of dimethylol thiourea and 5 parts of concentrated aqueous ammonia (28%), with the filaments-to-solution ration being maintained at 1 : 50, and treated at 60° C. for the periods of time indicated in Table 4, thereby to introduce thiourea into the phenolic filaments. The thiourea content of the filaments was determined on the basis of the weight increase and the analysis of the nitrogen and sulfur contents in the filaments. Furthermore, the physical properties, bending strength and heat resistance of the filaments were measured, and the results obtained are shown in Table 4.

Table 4

| Run Nos. | Treating time (min.) | Weight increase (%) | Amount of thiourea introduced (wt. %) | Bending strength (times) | Heat resistance | | Yarn properties | |
|---|---|---|---|---|---|---|---|---|
|  |  |  |  |  | Maximum temperature reached (° C.) | Time required until 300° C. was reached | Tenacity (g/d) | Elongation (%) |
| T-1 | 5 | 0.5 | 0.4 | 42 | 450 | 42 | 1.2 | 3.5 |
| T-2 | 40 | 2.5 | 1.8 | 220 | 280 | Not reached | 1.4 | 21.2 |
| T-3 | 60 | 6.1 | 5.1 | 370 | 200 | " | 1.5 | 20.5 |
| T-4 | 120 | 11.3 | 9.2 | 480 | 200 | " | 1.4 | 18.3 |
| T-5 | 300 | 17.5 | 14.3 | 250 | 215 | " | k.2 | 19.1 |
| T-6 | 600 | 22.2 | 18.3 | 170 | 220 | " | 1.0 | 17.9 |

It is seen from Table 4 that the weight increase of 2 to 20% is preferred, and most preferably, the weight increase is 3 to 15%. The weight increase of more than 20% greatly contributes to the heat resistance of the fibers, but the properties of the filaments rather tend to deteriorate.

EXAMPLE 9

The uncured filaments obtained from the novolac resin which was prepared in Example 7 were dipped in a mixed solution of formaldehyde and hydrochloric acid of the same composition as in Example 7, and the solution was heated to 95° C. in the course of 100 minutes. Immediately then, the filaments were withdrawn, washed with water and dried. The partially cured filaments obtained were dipped in a mixture of 90 parts of a 37% aqueous solution of formaldehyde and 10 parts of a 28% aqueous solution of ammonia, and the solution was heated to 95° C. from 25° C. in the course of 1 hour. The filaments were cured at this temperature for 1 hour to form 55 d/18 f phenolic filaments. The cured filaments showed a weight increase of 9.5%, and contained 2.1% of a methanol-extracted portion.

The phenolic filaments prepared above were dipped in a mixture of 290 parts of dimethyl formamide, 3 parts of urea, 7 parts of a 37% aqueous solution of formaldehyde, and 0.5 part of triethyl amine, and treated for 5 minutes at 80° C. The filaments were withdrawn, squeezed to an extent of 50%, and heat treated for 30 minutes in a hot air circulating type dryer held at 150° C. The filaments were then treated with hot methanol, washed with water, and dried to form modified phenolic filaments in which urea was introduced and which showed a weight increase of 5.8%. The results obtained are shown in Table 5.

was washed with water, and heated to 130° C. at 5 mmHg to remove low boiling compounds containing unreacted matters. The resulting phenol-p-cresol copolymerized novolac resin had a number average molecular weight of 850° C. Then, 30 parts of the novolac resin prepared in Example 7 and 70 parts of the copolymer prepared above were fully melted and mixed at 150° C. in a test tube equipped at its bottom with a projection having an opening with an inside diameter of 2 mm, and then extruded from the bottom at a nitrogen pressure of 0.2 Kg/cm$^2$, and wound up in filament form at a spinning speed of 900 m/min.

The resulting filaments were cured in the same way as in Example 7 to form phenolic filaments which exhibited a weight increase of 9.5 %. The amount of the methanol-soluble portion was 3.1 %.

The phenolic filaments were then dipped in a bath prepared by dissolving 10 parts of N-methylol acrylamide in 90 parts of a mixture of dioxane and acetone and adding a small amount of ZnCl$_2$, and treated for 2 hours at 50° C. The filaments were then squeezed to an extend of 50%, and heat treated at 150° C. for 30 minutes. The filaments were washed with hot methanol and water, Table 5

|  | Nitrogen content (% by weight) | Number of bendings (times) | Heat resistance | | Yarn properties | |
| --- | --- | --- | --- | --- | --- | --- |
|  |  |  | Maximum temperature attained (° C.) | Time required until 300° C. was reached (min.) | Tenacity (g/d) | Elongation (%) |
| Control | 0 | 19 | 720 | 18 | 1.3 | 68.5 |
| Present invention | 2.4 | 120 | 200 | Not reached | 1.4 | 55.2 |

It is seen from Table 5 that the filaments of the present invention have improved heat resistance.

EXAMPLE 10

The phenolic filaments obtained in Example 7 were cut to a length of 2 inches, and carded. A random web having a unit weight of 200 g/m$^2$ was prepared from the carded fibers. A solution of 0.2% of p-toluenesulfonic acid in a 5% methanol solution of dimethylol ethyleneurea was sprayed uniformly onto the web. Then, the web was treated for 40 minutes in a hot air circulating dryer whose inside temperature was adjusted to 140° C. The web was immersed in hot methanol, washed with water, and dried to form a non-woven cloth consisting of modified phenolic fibers showing a weight increase of 4.2%. The heat resistance of the treated non-woven cloth was measured in the same way as in Example 7. It was found that even when the cloth was heated at 200° C. for 100 hours, the temperature of the inside of the cloth did not go beyond 200° C. When the cloth was withdrawn out of the dryer after the test, no apparently great change was observed not only on the periphery of the cloth but also in its center. After the test, the weight loss of the cloth was 0.8%. The same test was conducted in a hot air circulating type dryer at 220° C., and it was found that the temperature of the inside (center) of the fiber ball did not go beyond 220° C. when the fiber ball was left to stand for 100 hours. The weight loss was 1.7%.

EXAMPLE 11

A mixture consisting of 140 g of phenol, 54 g of p-cresol, 130 g of a 37 % aqueous solution of formaldehyde and 1 g of oxalic acid was heated at 100° C. with stirring for 3 hours. The product was neutralized with 0.9 g of sodium hydroxide. The novolac resin obtained and dried to form modified phenolic filaments which exhibited a weight increase of 12 %. The filaments had a tensile strength of 1.3 g/d and an elongation of 32 %, and showed complete incombustibility.

In the same heat resistance test as used in Example 7, the temperature of the inside (center) of the fiber ball reached the external temperature (220° C.) in 22 minutes, but after that, the temperature did not exceed 200° C. even when the fiber ball was allowed to stand for 50 hours at this temperature. When the fiber ball was withdrawn from the dryer, it showed a weight decrease of 2.5 %. The filaments had a tenacity of 1.3 g/d and an elongation of 9.5 %. The untreated filaments showed selfburning phenomenon in a heat resistance test at 170° C. and in 30 minutes, the fiber ball was completely reduced to ash.

EXAMPLE 12

800 g of the novolac resin prepared in Example 7 and 200 g of 12 nylon having an intrinsic viscosity of 1.1 were mixed with each other in the powdery state, and uniformly melted in a flask filled with nitrogen gas while maintaining the external temperature of the flask at 250° C. After cooling, the resin was taken out, and pulverized. The pulverized resin was melt-spun in the same way as in Example 7, and wound up in the filament form. The resulting uncured filaments were knitted by a circular knitting machine. The knitted fabric was cured in accordance with the procedure set out in Example 9, thereby to form cured filaments having a weight increase of 12 %. The amount of the methanol-soluble portion was 0.8 %. The knitted fabric was dipped in a mixture consisting of 90 parts of dioxane, 10 parts of trimethylol melamine and 1 part of p-toluenesulfonic acid, with the fabric-to-mixture ratio being maintained at 1 : 20, and reacted at 100° C. for 5 hours. The treated fabric was treated with hot methanol, washed with water, and then dried to form a circular-knitted fabric consisting of modified phenolic filaments which exhibited a weight increase of 4.5 %. When the fabric was tested as to its heat resistance in the same way as in Example 7, the temperature at which the fabric was ashed was at least 50° C. higher than the untreated fabric.

EXAMPLE 13

104 parts of p-chlorophenol, 64 parts of a 37 % aqueous solution of formaldehyde and 3 parts of oxalic acid were heated at 100° C. with stirring for 2 hours. Then, 276 parts of phenol was added, and further, 175 parts of a 37 % aqueous solution of formaldehyde was added in the course of 30 minutes, thereby to form a copolymer of p-chlorophenol and phenol. The resulting viscous resin was thoroughly washed with warm water held at 40° C. and heated at reduced pressure to evaporate off the unreacted phenol and formaldehyde and water. There was obtained a thermoplastic copolymerized novolac resin having a number average molecular weight of 820. 500 g of the resin was pulverized coarsely, and fully dried. The resin was then placed in a 1-liter stainless steel melting vessel adapted to be heated externally. The vessel was purged repeatedly with nitrogen gas, and then the resin was melted while maintaining the temperature of the inside of the vessel at 160° C. The molten resin was extruded at a rate of 3 g/min. from a nozzle having 18 holes each with a diameter of 2.5 mm and heated at 160° C. which was attached to the bottom of the melting vessel through a gear pump. The extrudate was wound up on a bobbin at a spinning speed of 1050 m/min. as a 50 d/18 f yarn using a winder provided 1.5 m below the nozzle. The yarn on the bobbin was then cut, and separated from the bobbin as a tow form. There were obtained uncured phenolic filaments containing 8.2 % of chlorine.

100 parts of the filaments were dipped at 20° C. in 1500 parts of a mixed aqueous solution containing 15 % of formaldehyde and 16 % of hydrochloric acid, and the solution was heated gradually to 95° C. in the course of 3 hours. The filaments were further treated at this temperature for 20 minutes thereby to cure only the outer surface layer of the filaments. The filaments were withdrawn from the solution, washed with water, and then dipped in 1500 parts of a mixture consisting of 1400 parts of a 37 % aqueous solution of formaldehyde, 1300 parts of a 35.5 % aqueous solution of hydrochloric acid, 240 parts of urea and 2840 parts of methanol, and the solution was heated to 63° C. in the course of 2 hours. The filaments were further cured in this solution for 4 hours at this temperature, and then placed in methanol at 65° C. The resulting cured phenolic filaments were thoroughly washed with warm water at 40° C. and dried at reduced pressure to form incombustible and infusible phenolic filaments. The heat resistance of the filaments was measured as follows: 2 g of the filaments were made into a fiber ball having a diameter of about 3.0 cm (packing density of $0.15 g/cm^3$), and allowed to stand in a hot air circulating type dryer held at 240° C. The temperature of the inside (center) of the fiber ball was continuously measured for 2 hours using a thermocouple thermometer.

The maximum temperature which the filaments reached and where heat decomposition occurred, the time (minutes) required until the temperature of the filaments reached 300° C. were determined, and the heat resistance was evaluated. The results are shown in Table 6.

Table 6

| | | | Heat resistance | | Properties of the filaments | | | |
| | | | Maximum | Time required | Raw filaments | | Heat-treated filaments | |
| | Cl content (wt.%) | N content (wt.%) | temperature reached (° C) | until 300° C. was reached (min.) | Tenacity (g/d) | Elongation (%) | Tenacity (g/d) | Elongation (%) |
|---|---|---|---|---|---|---|---|---|
| Present invention | 7.1 | 3.6 | 240 | Not reached | 1.6 | 49 | 1.8 | 11.5 |

EXAMPLE 14

128 parts of o-chlorophenol, 73 parts of a 37 % aqueous solution of formaldehyde and 5 parts of p-toluenesulfonic acid were heated with stirring at 100° C. for 24 hours. The reaction product separated into two layers. The lower layer was withdrawn, washed throughly with warm water, and heated at 200° C. at reduced pressure. Thus, the unreacted matters were evaporated off, and a resin having a number average molecular weight of 420 was prepared.

The resulting resin was mixed with the chlorine-free novolac resin having a number average molecular weight of 870 which was obtained in Example 13 in various proportions, and the mixture was melted. The molten mixture was melt-spun in accordance with the procedure set out in Example 13 to form an uncured yarn (50 d/18 f). The uncured yarn was dipped at room temperature in a solution consisting of 700 parts of 35.5 % hydrochloric acid, 250 parts of dimethylol thiourea and 150 parts of ethanol, with the yarn-to-solution ratio being maintained at 1 : 100. The solution was heated to 85° C. in the course of 10 hours, and the yarn was then cured at this temperature for 10 hours to form cured phenolic filaments.

The thiourea content of the filaments was determined on the basis of the analysis of the nitrogen and sulfur contents of the filaments. The heat resistance of the filaments was also measured in accordance with the procedure shown in Example 13. The results are shown in Table 7.

Table 7

| | | | Heat resistance | | | |
| | o-chlorophenol resin/novolae resin(wt.%) | Amount of thiourea introduced (wt.%) | Maximum temperature reached (° C) | Time required until 300° C. was reached | Yarn properties | |
| | | | | | Tenacity (g/d) | elongation (%) |
|---|---|---|---|---|---|---|
| Control Precent | 1/99 | 6.4 | 670 | 30 | 1.7 | 60 |

Table 7-continued

|  | o-chlorophenol resin/novolae resin(wt.%) | Amount of thiourea introduced (wt.%) | Heat resistance | | Yarn properties | |
|---|---|---|---|---|---|---|
|  |  |  | Maximum temperature reached (° C) | Time required until 300° C. was reached | Tenacity (g/d) | elongation (%) |
| invention | 3/97 | 5.9 | 290 | Not reached | 1.6 | 58 |
| " | 5/95 | 5.7 | 270 | " | 1.5 | 60 |
| " | 10/90 | 6.0 | 250 | " | 1.5 | 55 |
| " | 25/75 | 5.5 | 240 | " | 1.5 | 50 |

As is clear from Table 7, the heat resistance of the filaments increased with the addition of the o-chlorophenol resin. The amount required of the o-chlorophenol resin is at least 3 %, preferably at least 10 % most preferably at least 20 %.

EXAMPLE 15

163 parts of 3,5-dichlorophenol, 71 parts of a 37 % aqueous solution of formaldehyde, 4 parts of oxalic acid and 20 parts of methanol were mixed, and heated with stirring at 100° C. for 2 hours. The resulting viscous resin was heated at reduced pressure to form a phenol resin having a number average molecular weight of about 920.

The resin was melted at 240° C. and spun in a test tube to form a filament having 2.5 denier.

The filament obtained was dipped in a mixture of 18 % hydrochloric acid and 15 % formaldehyde with the filament-to-mixture ratio being maintained at 1 : 50, and the mixture was heated from room temperature to 95° C. in the course of 2 hours. The filament was further cured at this temperature for 7 hours to form an infusible incombustible filament.

The cured phenolic filament was divided into two portions. One portion was dipped in a mixed solution obtained by dissolving 40 parts of dimethylol urea in 250 parts of dimethyl formamide and adding 3 parts of triethyl amine. The filament-to-solution ratio was maintained at 1 : 100. The filament was treated in this solution at 80° C. for 3 hours. After treatment, the filament was withdrawn, washed thoroughly with water, and then dried. The properties, heat resistance and bending strength of the filament were then measured. The bending strength was measured in the same way as set out in Example 7. The results are shown in Table 8.

acid and 120 parts of methanol, and 715 parts of a 37 % aqueous solution of formaldehyde was added portionwise to the solution at 110° C. in the course of 10 hours. After the addition, the reaction was continued for an additional 2 hours. The resin layer at the bottom was thoroughly washed with warm water, and dissolved in 1800 parts of methanol. The solution was then heated at reduced pressure to evaporate off the unreacted matters, methanol and a small amount of water to form a resin having a number average molecular weight of 720. The resin obtained was melt-spun in accordance with the procedure set out in Example 13 to form filaments (93 d/32 f).

The filaments were then dipped in a solution consisting of 18 % hydrochloric acid and 5 % formaldehyde, and the solution was heated from 30° C. to 90° C. in the course of 1 hour. The filaments were further maintained at 90° C. for 10 minutes in this solution. The filaments were washed with water and dried to form partially cured filaments which were cured only on their peripheral surfaces. The partially cured filaments were dipped at 30° C. in a solution consisting of 10 parts of trimethylol melamine, 50 parts of dioxane, 5 parts of a 28% aqueous solution of ammonia, 30 parts of a 37% aqueous solution of formaldehyde, and 100 parts of water, and then the solution was heated to 85° C. in the course of 3 hours. At this temperature, the filaments were maintained for 2 hours in this solution. The cured filaments obtained were washed with water, and dried to form infusible incombustible cured filaments which had a tenacity of 1.2 g/d and an elongation of 48%. When the filaments were heated for 100 hours at 200° C., they had a tenacity of 1.1 g/d and an elongation of 21%, and exhibited superior heat resistance.

Table 8

|  | N content (wt.%) | Bending Strength (times) | Heat resistance | | Yarn properties | |
|---|---|---|---|---|---|---|
|  |  |  | Maximum temperature reached (° C) | Time(minutes) required until the filament reached 300° C. | Tenacity (g/d) | Elongation (%) |
| Filaments of the present invention | 2.5 | 420 | 250 | Not reached | 1.5 | 48 |
| Comparison | 0 | 35 | 390 | 45 | 1.2 | 35 |

It is seen from Table 8 that the filament of this invention has superior tenacity, elongation, and bending strength as well as heat resistance.

When the filament of this invention obtained above was heated at 250° C. for an additional 20 hours, the maximum temperature which the filament attained was 240° C. The filament as heat-treated had a tenacity of 1.6 g/d and an elongation of 20 % and proved fully feasible.

EXAMPLE 16

380 parts of m-chlorophenol and 658 parts of phenol were dissolved in 35 parts of concentrated hydrochloric

EXAMPLE 17

A p-bromophenol-containing copolymerized phenol resin was prepared by the same procedure as in Example 13 except that 138 parts of p-bromophenol was used. The resin was a light yellow solid having a number average molecular weight of 870. The copolymerized resin was heated at 180° C. in a test tube equipped with a projection having one hole with an inside diameter of 30 mm, and extruded from the hole at a nitrogen pressure of 0.2 kg/cm². The extrudate was taken up in the form of filament at a spinning speed of 950 m/min.

The filament having 4 denier obtained above was dipped at room temperature in a mixed solution of 15% hydrochloric acid and 15% formaldehyde, and further, the solution was heated to 105° C. in the course of 2 hours to cure only the outer layer of the filament. The filament was then treated with the same curing treatment solution containing urea as prepared in Example 13 for a predetermined time at 65° C. to form a filament having various curing degrees.

The weight increase caused by curing and the urea content based on the nitrogen content of the filament were determined. The tenacity, elongation and heat resistance of the filament were measured in accordance with the procedure set out in Example 13. Furthermore, the bending strength of the filament was measured in accordance with the procedure set out in Example 13. The results are shown in Table 9.

Table 9

| Exp. No. | Treating time (minutes) | Weight increase (wt. %) | Content of urea introduced (wt %) | Bending strength (times) | Heat resistance Maximum temperature reached (° C) | Time required until 300° C. was reached | Yarn properties Tenacity (g/d) | Elongation(%) |
| --- | --- | --- | --- | --- | --- | --- | --- | --- |
| 1 | 20 | 1.5 | 1.1 | 25 | 420 | 52 | 1.1 | 53 |
| 2 | 40 | 2.7 | 2.0 | 150 | 290 | Not reached | 1.2 | 55 |
| 3 | 60 | 7.5 | 5.3 | 270 | 250 | " | 1.4 | 50 |
| 4 | 120 | 10.4 | 7.2 | 470 | 240 | " | 1.5 | 45 |
| 5 | 360 | 17.2 | 11.5 | 340 | 240 | " | 1.5 | 43 |
| 6 | 1,200 | 20.9 | 13.6 | 290 | 240 | " | 1.3 | 39 |

It is seen from Table 9 that the filament should have a urea content of at least 1.5 %, preferably 3 to 12%, and more preferably 4.0 to 10%.

EXAMPLE 18

700 parts of the copolymerized novolac resin containing p-bromophenol which was prepared in Example 17 and 300 parts of nylon 12 having an intrinsic viscosity, as measured in 95 % sulfuric acid, of 1.2 were mixed in the powdery state, and uniformly mixed and melted in a flask purged with nitrogen while maintaining the external temperature of the flask at 220° C. After cooling, the resin was withdrawn from the flask, and coarsely pulverized. The pulverized resin was melt-spun in the same way as set forth in Example 13, and wound up in filament form to form uncured filaments (90 d/32 f).

The uncured filaments obtained were knitted on a circular knitting machine. The resulting fabric was allowed to react for 10 hours at 50° C. in a mixed solution consisting of 18% hydrochloric acid and 18% formaldehyde. The fabric was then washed with water, and then allowed to react at 80° C. for 2 hours in a mixed solution consisting of 90 parts of a 37% formaldehyde and 10 parts of a 28% aqueous solution of ammonia to cure the constituent filaments of the fabric. The fabric was then dipped in a bath prepared by dissolving 10 parts of N-methylol acrylamide in 90 parts of a 1 : 1 mixed solvent of dioxane and acetone and adding 5 parts of zinc chloride, and treated for 3 hours at 55° C. The fabric was squeezed by means of a mangle to a squeezing extent of 100 %, and heat treated in dry condition for 1 hour at 130° C. The fabric was washed with hot methanol, and then washed with water, There was obtained a fabric composed of modified phenolic filaments having a nitrogen content of 2.1 % which exhibited a weight increase of 10%. The knitted fabric was found infusible and incombustible.

When the heat resistance of the knitted fabric was measured in accordance with the same procedure as in Example 13, it was found that the temperature of the inside (center) of the fiber ball did not go beyond the external temperature (240° C.) which was reached in 20 minutes, and that even when the fiber ball was allowed to stand for 100 hours, the temperature did not exceed 240° C. The fabric which was withdrawn from the dryer after the heat resistance test was found to turn brown. It showed a weight decrease of 3.1%, and had a tenacity retention of 92% and an elongation retention of 61%.

EXAMPLE 19

1410 g of phenol, 1120 g of a 37 % aqueous solution of formaldehyde, 20 g of oxalic acid and 150 g of methanol were heated with stirring at 100° C. for 3 hours. Then, a large amount of cold water was added to stop the reaction. The resulting phenol resin was dissolved in methanol, and heated at reduced pressure to evaporate off the unreacted phenol, formaldehyde and methanol and some amount of methanol to form a thermoplastic novolac resin having a number average molecular weight of 960. 500 g of the resin was coarsely pulverized and dried sufficiently. A flask was charged with the pulverized resin and 50 g of urea, and purged repeatedly with nitrogen. The mixture was melted while maintaining the temperature of the inside of the flask at 160° C., and stirred for 30 minutes. Since urea had good compatibility with the novolac, they could be uniformly and thoroughly mixed. The resulting mixture was coarsely pulverized, and placed in a stainless steel melting vessel adapted to be heated externally. After repeated purging of the vessel with nitrogen gas, the mixture was melted while maintaining the temperature of the inside of the vessel at 160° C. The molten mixture was extruded at a rate of 3 g/min. from a nozzle held at 160° C. and having 18 holes each with a diameter of 2.5 mm which was secured to the bottom of the melting device through a gear pump. The resulting filaments (50 d/18 f) were wound up at a spinning velocity of 1050 m/min. on a bobbin using a winder provided at a position 1.5 meters under the nozzle. The filaments were cut on the bobbin, and separated from it in the form of tow.

100 parts of the novolac filaments were immersed at 20° C. in 1500 parts of a solution consisting of 14% formaldehyde and 16% hydrochloric acid, and the solution was gradually heated to 95° C. in the course of 3 hours. The filaments were treated at 95° C. for an additional 8 hours, washed with water, and dried to form cured modified phenolic filaments which showed a weight increase of 12.5%. The tenacity and elongation of the filaments were measured. The bending strength of the filaments was also measured by the method set out in Example 7. The heat resistance of the filaments was measured by the method set out in Example 7. The nitrogen content of the filaments was also measured.

As a control, the above novolac resin not containing urea was spun under the same conditions, and cured in the same way to form phenolic filaments.

The results are shown in Table 10.

Table 10

|  | Nitrogen content (wt.%) | Bending strength (times) | Maximum temperature reached (° C.) | Time required until 300° C. was reached (minutes) | Yarn properties | | | |
|---|---|---|---|---|---|---|---|---|
|  |  |  |  |  | Raw yarn | | Heat-treated yarn | |
|  |  |  |  |  | Tenacity (g/d) | Elongation (%) | Tenacity (g/d) | Elongation (%) |
| Control | 0 | 22 | 690 | 15 | 1.2 | 23.2 | Not measurable because of ashing | |
| Present invention | 3.2 | 2089 | 200 | Not reached | 1.6 | 45.0 | 1.7 | 21.0 |

It is seen from Table 10 that the filaments of the present invention have superior tenacity, elongation and bending strength as well as excellent heat resistance.

EXAMPLE 20

500 g of the fusible novolac resin obtained in Example 19 was coarsely pulverized, and fully dried. The pulverized resin was charged into a 1-liter stainless steel melting vessel adapted to be heated externally and equipped with a stirrer together with a predetermined amount of thiourea. The vessel was repeatedly purged with nitrogen gas, and the mixture was melted while maintaining the temperature of the inside of the vessel at 160° C. and stirred for 30 minutes. The compatibility between the novolac resin and thiourea was satisfactory. The resulting mixture was melt-spun in the same way as in Example 19. When the thiourea content of the novolac resin was not more than 30% by weight, the spinning of the resin became difficult although gradually. The uncured filaments obtained were dipped in a mixed solution of formaldehyde and hydrochloric acid, and the solution was heated to 95° C. in the course of 100 minutes. The filaments were then withdrawn immediately, washed with water, and dried. The partially cured filaments obtained were dipped in a mixed solution consisting of 90 parts of a 30% aqueous solution of formaldehyde and 10 parts of a 28% aqueous solution of ammonia, and the solution was heated from 25° C. to 95° C. in the course of 60 minutes. Furthermore, the filaments were allowed to cure at this temperature for 1 hour to form cured phenolic filaments. The weight increase, and the thiourea content on the basis of the analysis of the nitrogen and sulfur contents of the filaments, were determined. The tenacity, elongation, bending strength, and heat resistance of the filaments were measured in accordance with the procedure shown in Example 19. The results are shown in Table II. As regards the flame resistance, L.O.I. value was measured.

Table 11

| Samples | Amount of thiourea blended (wt.%) | Weight increase (wt.%) | Content of thiourea (wt.%) | Building strength (times) | Heat-resistance Maximum temp. reached (° C) | Flame-resistance LOI valve | Yarn properties | |
|---|---|---|---|---|---|---|---|---|
|  |  |  |  |  |  |  | Tencity (g/d) | Elongation (%) |
| B-1 | 0.1 | 12.3 | 0 | 30 | 723 | 26.5 | 1.2 | 22.5 |
| B-2 | 0.3 | 12.5 | 0.2 | 102 | 205 | 27.8 | 1.3 | 25.0 |
| B-3 | 1.2 | 11.8 | 0.4 | 213 | 205 | 26.8 | 1.4 | 28.8 |
| B-4 | 3.0 | 12.6 | 2.8 | 1075 | 200 | 26.9 | 1.7 | 48.6 |
| B-5 | 9.5 | 12.8 | 8.6 | 2015 | 200 | 26.8 | 1.8 | 50.5 |
| B-6 | 18.0 | 11.9 | 15.9 | 710 | 200 | 28.5 | 1.6 | 45.5 |
| B-7 | 28.0 | 13.5 | 28.1 | 320 | 200 | 24.6 | 1.4 | 38.8 |
| B-8 | 35.0 | 13.2 | 33.6 | 50 | 200 | 21.5 | 1.1 | 40.0 |

It is seen from Table II that the suitable amount of thiourea to be blended is 0.2 to 30% by weight in view of the tenacity, elongation, heat resistance, and heat resistance of the filaments, and the amount is preferably 1 to 20% by weight, and more preferably 3 to 10% by weight. Amounts in excess of 30% by weight give favorable effects on the heat resistance, but are undesirable on the flame resistance.

EXAMPLE 21

500 g of the fusible novolac resin obtained in Example 19 was coarsely pulverized, dried fully, and mixed with 50 g each of the nitrogen-containing compounds indicated in Table 12 in a flask purged repeatedly with nitrogen. The mixture was melted while maintaining the inside of the flask at 180° C. and stirred for 30 minutes. The uniform mixing of the novolac with the nitrogen-containing compound could be achieved easily. The mixture was coarsely pulverized, and melt-spun in the same way as set forth in Example 19. The resulting uncured filaments were dipped in a mixed solution of formaldehyde and hydrochloric acid same as in Example 19, and the solution was heated to 95° C. in the course of 100 minutes. Then, immediately, the filaments were withdrawn, washed with water, and dried. The partially cured filaments obtained were dipped in a mixed solution consisting of a 37% aqueous solution of formaldehyde, 30 parts of a 35 % aqueous solution of hydrochloric acid and 40 parts of methanol, and the solution was heated from 25° C. to 65° C. in the course of 30 minutes. The curing reaction was performed at this temperature for 90 minutes to form cured phenolic filaments. The nitrogen content of the filaments was measured, and the amount of the nitrogen-containing compound contained in the filaments was determined. The various properties of the filaments are shown in Table 12.

Table 12

| Additive | Weight increase (wt.%) | Content of the additive (wt.%) | Bending strength (times) | Heat-resistance Maximum temperature reached (° C.) | Yarn properties Tenacity(g/d) | Elongation(%) |
|---|---|---|---|---|---|---|
| Monomethylol urea | 11.3 | 7.9 | 1820 | 200 | 1.6 | 42.5 |
| Dimethylol urea dimethyl ether | 13.1 | 8.5 | 2120 | 200 | 1.8 | 44.1 |
| Ethylene thiourea | 11.2 | 7.1 | 730 | 210 | 1.4 | 31.2 |
| Guanidine | 9.5 | 6.6 | 410 | 220 | 1.3 | 39.2 |
| Melamine | 13.3 | 7.2 | 510 | 200 | 1.5 | 39.8 |
| Polyacrylamide | 11.2 | 8.3 | 310 | 210 | 1.2 | 34.2 |
| Dicyandiamide | 9.2 | 7.0 | 250 | 240 | 1.1 | 30.4 |

It is seen from Table 12 that phenolic filaments having excellent heat resistance can be obtained by the process of this invention, and that the addition of urea or thiourea is especially desirable.

EXAMPLE 22

1000 g of the resin obtained in Example 19 was dissolved in 5 liters of ethanol, and 80 g of tetraoxane and 90 g of urea were added, followed by stirring the mixture at 60° C. Ethanol was then evaporated off at reduced pressure to form a resin. The resin was melt-spun in the same way as in Example 19, and 100 g of the resulting filaments were dipped at room temperature in a mixed solution consisting of 550 g of a 37% aqueous solution of formaldehyde and a 35% aqueous solution of hydrochloric acid, and the solution was then heated gradually to 95° C. The filaments were withdrawn, and immediately then, dipped at 70° C. in a mixed aqueous solution containing 5% of hydrochloric acid and 23% of formaldehyde. The solution was heated to 90° C., and the curing treatment was continued at this temperature for 40 minutes. The resulting filaments were treated with a 65% aqueous solution of methanol at 60° C. for 30 minutes, washed thoroughly with water, and dried. The weight increase was 5.2%. The filaments had a tenacity of 1.6 g/d and an elongation of 41.2%.

The heat resistance of the filaments was measured in the same way as in Example 7. The maximum temperature reached was 200° C. When the filaments were further heat-treated for 100 hours in the heat resistance test, the resulting filaments had a tenacity of 1.5 g/d and an elongation of 9.2%.

What we claim is:

1. A process for producing non-flammable, anti-fusing novolak resin filament having improved heat resistance and bending properties which comprises melt-spinning a fiber-forming novolak resin which contains a fiber-forming thermoplastic synthetic polyamide resin selected from the group consisting of nylon 6, nylon 11, nylon 12, nylon 66, nylon 610, nylon 611, and nylon 612 in an amount less than 40% by weight based on the total filament weight, and curing the resulting filament with an aldehyde in the presence of a basic or acid catalyst to a final curing degree of 3 to 30%, and applying a urea compound of the formula (A)

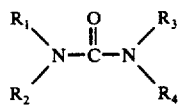

(A)

wherein $R_1$, $R_2$, $R_3$ and $R_4$, which may be the same or different, represent a hydrogen atom, lower hydroxyalkyl group or lower alkoxyalkyl group, to said novolak resin to provide the novolak resin filament which contains in its fiberous structure a bond of the formula

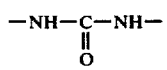

in the amount of 0.5 to 25% by weight based on the weight of the filament.

2. The process of claim 1 which comprises melt-spinning a novolak resin containing 0.2 to 30% by weight of at least one urea compound of formula (A) and then curing the resulting filaments by a method known per se.

3. The process of claim 1 which comprises immersing the melt-spun uncured novolak filament in an aqueous solution containing an acid catalyst and an aldehyde, heat-treating the filament to cure the filament partially to a curing degree of 0.0 to 3%, immersing the resulting partially cured filament in an inert organic solvent or water-organic solvent containing 0.2 to 35% by weight based on the weight of the solvent of at least one urea compound of formula (A) and heat-treating the filaments at 20° to 120° C.

4. The process of claim 3 wherein said organic solvent is selected from the group consisting of methanol, ethanol, isopropanol, acetone, dimethyl ethyl ketone, dioxane, tetrahydrofuran, dimethyl formamide, dimethyl sulfoxide, dimethyl acetamide, benzene, toluene and xylene.

5. The process of claim 1 which comprises melt-spinning a fiber-forming novolak resin, curing the resulting filament by a method known per se to a curing degree of 2 to 20% to form non-flammable and anti-fusing phenolic filament, and then treating the resulting cured filament at 20° to 120° C. in an aqueous solution, organic solvent solution or water-organic solvent solution containing 0.5 to 30% by weight based on the weight of the solvent of at least one urea compound of formula (A).

6. The process of claim 1 wherein said compound of formula (A) is urea, a mono- or dimethylol derivative of urea or mono- or di-methyl or ethyl ether of urea.

7. The process of claim 1 wherein said fiber-forming novolak resin contains 5 to 30% by weight of said fiber-forming thermoplastic synthetic resin.

8. The process according to claim 1 wherein the urea compound of the formula (A) is applied to the novolak resin before the curing treatment.

9. The process according to claim 1 wherein the urea compound of the formula (A) is applied to the novolak resin during the curing treatment.

10. The process according to claim 1 wherein the urea compound of the formula (A) is applied to the novolak resin after the curing treatment.

11. The process according to claim 1 wherein said novolak resin has a number average molecular weight of about 300 to about 2000 and is the reaction product of a phenol with an aldehyde in the presence of an acid or basic catalyst.

12. The process according to claim 11 wherein the urea compound of the formula (A) is urea.

13. A process for producing non-flammable, anti-fusing novolak resin filament having improved heat resistance and bending properties which comprises melt-spinning a fiber-forming novolak resin which contains less than 40% by weight based on the total filament weight of a fiber-forming thermoplastic resin, said fiber-forming novolak resin having a number average molecular weight of about 300 to about 2,000 and being the reaction product of a phenol with an aldehyde in the presence of an acid or basic catalyst, and curing the resulting filament with an aldehyde in the presence of a basic or acid catalyst to a final curing degree of 3 to 30%, and applying urea to the novolak resin to provide a novolak resin filament which contains in its fiberous structure a bond of the formula

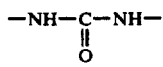

in an amount of 0.5 to 25% by weight of the novolak resin filament.

14. The process of claim 13 which comprises melt-spinning a mixture of a novolak resin with 0.2 to 30% by weight based on the total weight of the mixture of urea and then curing the resulting filament.

15. The process of claim 13 which comprises immersing the melt-spun uncured novolak filament in an aqueous solution containing an acid catalyst and an aldehyde, heat-treating the filament to cure the filament partially to a curing degree of 0.0 to 3%, immersing the resulting partially cured filament in an inert organic solvent or water-organic solvent containing 0.2 to 35% by weight of urea and heat-treating the filaments at 20° to 120° C.

16. The process of claim 15 wherein said organic solvent is selected from the group consisting of methanol, ethanol, isopropanol, acetone, dimethyl ethyl ketone, dioxane, tetrahydrofuran, dimethyl formamide, dimethyl sulfoxide, dimethyl acetamide, benzene, toluene and xylene.

17. The process of claim 13 which comprises melt-spinning said fiber-forming novolak resin, curing the resulting filament to a curing degree of 2 to 20% to form non-flammable and anti-fusing phenolic filament, and then treating the resulting cured filament at 20 to 120° C. in an aqueous solution, organic solvent solution or water-organic solent solution containing 0.5 to 30% by weight based on the weight of the solution of urea.

18. The process of claim 13 wherein said fiber-forming novolak resin contains 0% by weight of said fiber-forming thermoplastic synthetic resin.

19. The process of claim 13 wherein said fiber-forming novolak resin contains 5 to 30% by weight of said fiber-forming thermoplastic synthetic resin.

20. The process according to claim 13 wherein said fiber-forming thermoplastic synthetic resin is a polyamide which is selected from at least one member selected from the group consisting of nylon 6, nylon 11, nylon 12, nylon 66, nylon 610, nylon 611 and nylon 612.

21. The process according to claim 13 wherein urea is applied to the novolak resin before the curing treatment.

22. The process according to claim 13 wherein urea is applied to the novolak resin during the curing treatment.

23. The process according to claim 13 wherein urea is applied to the novolak resin after the curing treatment.

24. The process according to claim 19 wherein said fiber-forming thermoplastic synthetic resin is a polyamide selected from at least one member selected from the group consisting of nylon 6, nylon 11, nylon 12, nylon 66, nylon 610, nylon 611, and nylon 612.

* * * * *